United States Patent [19]

Dollerschell

[11] Patent Number: 4,458,189
[45] Date of Patent: Jul. 3, 1984

[54] CONTROL MODE SWITCHING CIRCUIT

[75] Inventor: John O. Dollerschell, St. Louis Park, Minn.

[73] Assignee: MTS Systems Corporation, Eden Prairie, Minn.

[21] Appl. No.: 405,866

[22] Filed: Aug. 6, 1982

[51] Int. Cl.$^3$ .............................................. H02P 5/00
[52] U.S. Cl. .................................... 318/591; 318/625; 318/646
[58] Field of Search ...................... 425/150; 364/160; 318/590, 591, 625, 646, 652

[56] References Cited

U.S. PATENT DOCUMENTS

| | | | |
|---|---|---|---|
| 3,668,379 | 6/1972 | Roberts et al. | 318/591 X |
| 3,712,125 | 1/1973 | Meyer | 73/90 |
| 3,742,324 | 6/1973 | Gross et al. | 318/591 |
| 3,800,588 | 4/1974 | Larson et al. | 73/71.6 |
| 3,800,589 | 4/1974 | Wawra et al. | 73/90 |
| 3,825,386 | 7/1974 | Bello et al. | 425/150 |
| 3,922,535 | 11/1975 | Randolph | 364/160 |
| 3,940,594 | 2/1976 | Bleak et al. | 318/591 X |
| 3,969,619 | 7/1976 | El-Ramly | 318/591 X |
| 4,141,065 | 2/1979 | Sumi et al. | 318/591 X |
| 4,304,540 | 12/1981 | Hammon | 425/150 |

FOREIGN PATENT DOCUMENTS 50488 4/1977 Japan ................................... 318/590

*Primary Examiner*—G. Z. Rubinson
*Assistant Examiner*—Richard M. Moose
*Attorney, Agent, or Firm*—Kinney & Lange

[57] ABSTRACT

A "mode switch" is used for smoothly switching a servovalve controlled device such as an SMC press, in particular, from control under one parameter to control by another. The mode switch provides a very smooth transfer of control from displacement control between two relatively movable parts to force control to provide for controlling the force exerted by actuators acting between the two parts. The mode switch electronically tracks the signals so that when the switching is made the signals are precisely equal to prevent abrupt changes in the control signals. This smooth transfer is achieved even under active control, that is when both control signals are changing in value.

7 Claims, 2 Drawing Figures

CONTROL MODE SWITCHING CIRCUIT

BACKGROUND OF THE INVENTION

1. Field of the Invention.

The present invention relates to switch devices for switching control of active elements from one parameter to another without causing disruptions or discontinuities in the control output devices.

2. Description of the Prior Art.

In the prior art, so called "bumpless transfer" has been sought after and various devices have been used for providing a transfer from one parameter to another. An example is U.S. Pat. No. 3,742,324 issued to Alan E. Gross et al. on June 26, 1973. This is a switching system for a servo mechanism that permits switching from one parameter to another, where the command is changed simultaneously with the feedback switch to match the forward loop error at the time of the switching. This technique works well, but involves substantial circuitry, and in active elements there is a possibility that a smooth transfer is not achieved when the variables are rapidly changing.

In particular, it has long been known to switch between "force" and "displacement" control in servo mechanisms.

In a servovalve controlled hydraulic press, and in particular in sheet molding compound presses, it is desirable to control the displacement between the two press parts as they are moving toward each other, and during the mold closing mode, but during the curing and final stages it is desirable to use force control for controlling the pressure between the two parts. This is set forth in U.S. patent application Ser. No. 237,690, filed Feb. 24, 1981, now abandoned in favor of a continuation application Ser. No. 493,651, filed May 11, 1983, and entitled Hydraulic Press, and owned by the same assignee as the present application, wherein a typical control circuit for such a press is illustrated in FIG. 12, and a mode switch is schematically represented at 163 in this figure. The mode switch of the present invention may be used for that control function in a circuit such as that shown in FIG. 12 of Application Ser. No. 237,690.

Additionally, the type of the circuit which can be controlled and utilized at this mode switch of the present invention is shown in U.S. Pat. No. 3,800,588. This circuit is also used for controlling SMC presses as outlined in said earlier Application Ser. No. 237,690.

A device that shows displacement control in a press until the force exceeds a set value and then switching to force control as shown in U.S. Pat. No. 3,825,386 which was issued to Bello et al. on July 23, 1974.

The circuit used in U.S. Pat. No. 3,825,386, however, does not provide the smooth transfer of the present device particularly when the elements are quite active.

SUMMARY OF THE INVENTION

The present invention relates to a circuit used for electronically switching from one mode of control of servovalve systems, in particular, to another without any discontinuity in the signal directly controlling the servovalve or servovalves to prevent a sudden change in movement of the controlled actuators. For example, in servovalve controls of presses or similar devices in hydraulic actuators, there are two general forms of control; displacement control, that is control of the distance between two relatively movable parts, and force control, which is control related to the differential pressure on the actuator or control related to directly measured forces. It is common to require displacement control during a portion of an operating cycle or during a set time of operation and to require force control for the actuators at a different time. If there is a disparity between the magnitude of the two control signals at the time of change from one control to the other, a bump or discontinuity will result in the controlled actuator.

The present device incorporates a circuit that maintains a precise output signal equality relationship between the control signals of the two parameters at the time "switching" occurs so that at the time of switching there is no "bump" or discontinuity in the operation. After the switching has occurred, then the new input signal will ramp or operate smoothly to its sensed control relationship to the feedback of the parameter that is being used.

In particular, a continuous comparison between the parameters is made and the difference is maintained at zero electronically on a line so that when a first parameter is used for control and is being provided to an output terminal, the line having the compared signal is maintained at a set level corresponding to the first parameter. When switching occurs the compared signal line is switched to the control output and the input of the second parameter simultaneously; the signals on the compared line and the first parameter control signal are the same. The input of the second parameter is connected to an integrator that subsequently causes the new output signal to be ramped to the control level for the second parameter.

When switching occurs in the other direction the circuit does not permit switching until the signals are equal.

DETAILED DESCRIPTION OF THE PREFERRED EMBODIMENT

Figure 1:
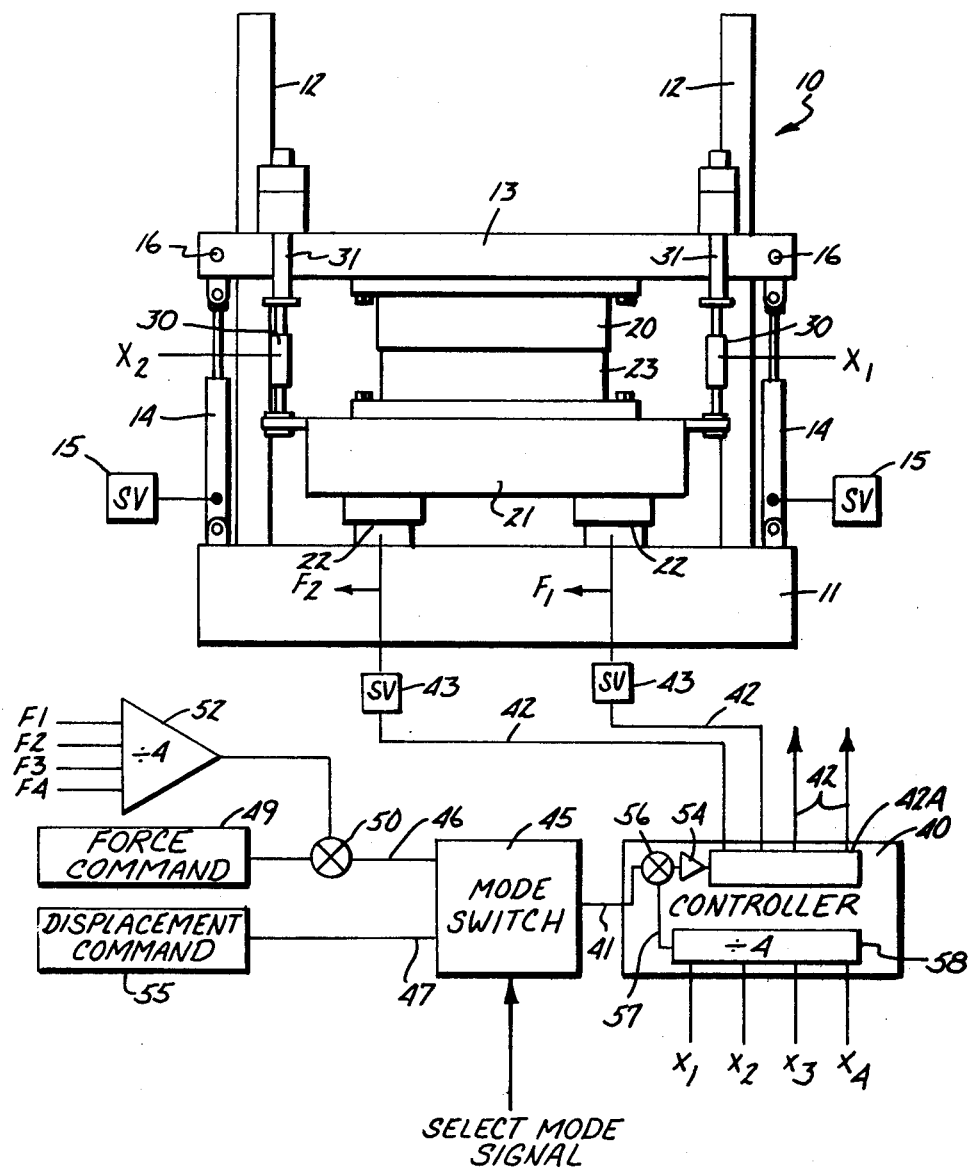
FIG. 1 is a schematic view of an SMC press having a control circuit utilizing the mode switch of the present invention.

The mode control switching circuit of the present invention is designed specifically for use in connection with an SMC molding press where change from displacement control to force control of two relatively moving parts must change during the molding process. To illustrate the environment, a molding press indicated generally at 10 includes a base 11, and upright columns 12. There are four such columns, and the molding press is shown only schematically in FIG. 1. A crosshead 13 is mounted for movement on the columns 12, and is controlled in its movement along the columns by cylinders 14 on opposite sides of the press. The cylinders are controlled through suitable valves 15 in a program so that they will raise and lower the crosshead 13 after the crosshead is unlatched from the columns. As shown the crosshead has hydraulic cylinders 16 that are used for clamping the crosshead to the columns when the crosshead is to be held.

The crosshead 13 carries an upper mold part 20 that is used in a molding operation.

A bolster 21 is mounted on four individual servovalve controlled hydraulic cylinders 22,22 and these cylinders control the movement of the bolster 21 and its attached mold part 23 in vertical direction toward and away from the crosshead relative to the base 11. The cylinders 22 as previously explained are servo valve controlled.

Additionally, displacement feedback transducers indicated at 30,30 which are mounted at the four corners of the mold assembly, and sense the displacement of the crosshead 13 relative to the bolster provide feedback signals designated by the letter X ($X_1$, $X_2$, $X_3$, $X_4$ for the four transducers). These transducers 30 as shown react with members 31 that are mounted for movement with the crosshead in the manner shown in U.S. Application Ser. No. 366,149, filed Apr. 7, 1982 for "Crosshead and Bolster Spacing Control for Servocontrolled Press." Application Ser. No. 366,149 is owned by the same assignee as the present application.

The device of the present invention can use either three or four actuators. A four actuator system is shown in U.S. Pat. No. 3,800,588 mentioned in the prior art section of this specification.

Additionally, force feedback represented by the symbols $F_1$, $F_2$, $F_3$ and $F_4$ is provided by differential pressure sensors sensitive to the differential pressure on the servovalve controlled actuators 22. The actuators 22 and thus bolster 21 are controlled in response to displacement feedback control for parallel and accurate movement during the initial mold closing operation. The actuators 22 are controlled under force control during the actual mold curing operation through known control functions.

The controller illustrated at 40 has a controller input signal line 41 and selectively receives either a displacement signal or an integrated force error signal, which in effect is a force derived displacement command signal. The controller also receives displacement signals $X_1$, $X_2$, $X_3$, and $X_4$ from each actuator 22. The controller functions are as described in U.S. Pat. No. 3,800,588. Thus the controller is only shown schematically. The controller is used for delivering signals for controlling the individual servovalves 43 along lines indicated at 42 from a signal distribution circuit 42A. Each servovalve 43 controls one of the respective hydraulic actuators 22. The signal input along line 41 comes from a mode switch 45 which is made according to the present invention and is provided for switching the control from force error control using a force error signal on line 46 to displacement command control from a command signal on a signal line 47.

Generally speaking the force error signal is derived from a force command signal from a signal generator 49 of suitable design and summing this signal at a summing junction 50 with an output signal along a line 51 from a force feedback averaging amplifier 52, which averages the force signals for the controlled actuators 22. The averaging of multiple force feedback signals, and then summing such average signal with the force command signal is called force error control. This is commonly done and is shown in the prior art. The mode switch, as will be explained, includes an integrator to integrate the force error signal before feeding it to the controller 40.

Additionally, the displacement command signal on line 47 may be provided by a displacement command generator 55, such as a tape recorder or other programmed analog signal generator. In one state of the mode switch the displacement command signal is transmitted directly to line 41 and thus to the controller 40. In the controller the signal on line 41 is compared at a summing junction 56 with an average displacement signal on a line 57 coming from an averaging amplifier or averager 58 having four inputs from the displacement feedback devices $X_1$, $X_2$, $X_3$, and $X_4$ shown in FIG. 1. An amplifier 54 is provided on the output line of summing junction 56.

In the sequence of operation, when the mold parts 20 and 23 are closing, the servovalves 43 are operated in displacement control by providing the displacement command signal to line 41 from generator 55, and when the mode switch 45 is actuated to its force control state a smooth transfer of the signal on line 41 will be made to force error control for the final molding and curing sequence.

Figure 2:
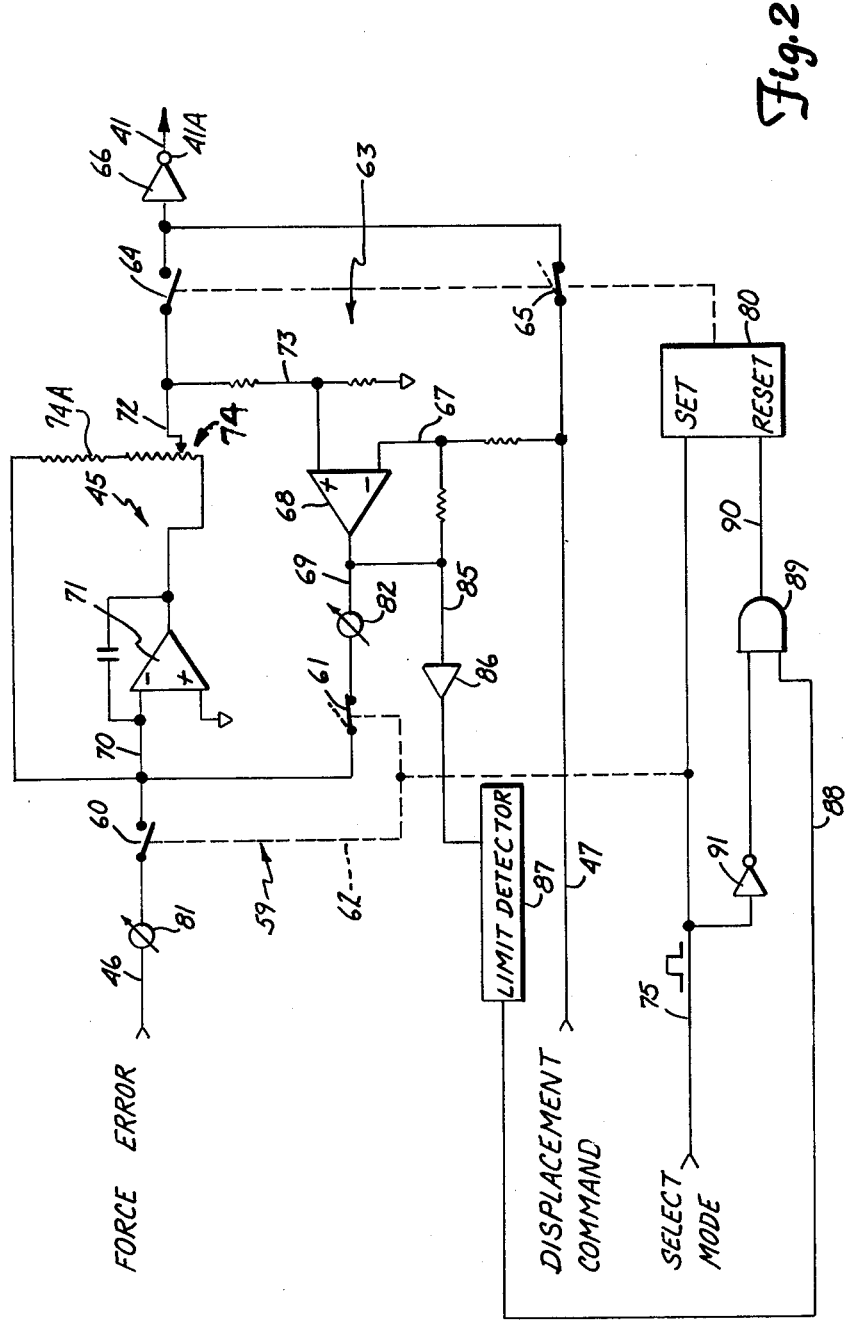
FIG. 2 is a schematic representation of the mode switching circuit made according to the present invention.

The detailed schematic showing of the mode switch 45 is in FIG. 2. The force error signal line 46 and the displacement command signal line 47 are illustrated. The circuit includes two sets of switches. The individual switch sets are simultaneously operated by a mode select signal provided in a conventional manner. While the switches are shown schematically as mechanical switches, electronic switches would normally be utilized. For example, a first switch set 59 includes a first switch 60 and a second switch 61 which are simultaneously operated by a connecting link indicated at 62. The first set can be operated in response to a mode select signal to select the mode. This mode select signal can be any desired signal, for example a conventional control pulse along a line 75. Assuming that the control for the actuators 22 is under displacement command as shown, a signal on line 75 to simultaneously actuate the first and second switches 60 and 61, (one is open and one is closed) can come from a suitable control on the molding press 10 that indicates either that the force has exceeded a certain level so that force control is necessary, or it can be from a mechanical switch to indicate when the two mold parts have moved sufficiently close together so that force control should be used.

The second set 63 of switches in the mode switch circuit, namely switches 64 and 65 are the switches that determine which one of the inputs from lines 46 and 47 is provided to the output represented by line 41. In the form shown in solid lines, the press is under displacement control and the switch 65 is closed, directly connecting line 47 to the mode switch output through a suitable amplifier 66 that is connected to the output terminal 41A and line 41. The switch set 63 is in its solid line portion when a flip flop 80 is "reset" as will be explained. In this mode, when actuators are in displacement control, the feedback is provided to keep the actuators 22 at the correct position through use of displacement feedback that controls the position of the bolster. The means for providing the feedback signal is described in U.S. Patent application Ser. No. 366,149, filed Apr. 7, 1982, so that when the crosshead 13 is raised as described in that application, the transducers 30 provide a signal for controlling the actuators 22 in displacement control.

With the present circuit connected as described and as shown, the displacement command signal line 47 is also coupled with a line 67 to the inverting input of a differential amplifier 68. The output of the amplifier on line 69 is connected through switch 61 (which is now closed) to a line 70 connected to the inverting input of an integrator 71. The noninverting input of integrator 71 is connected to circuit common. The output of the integrator is connected through a feed forward potentiometer 74 along a line 72 to a line 73 and through a suitable voltage divider, as shown two resistors, to the positive input of the amplifier 68. The output of the amplifier 68 is driven in a direction that tends to bring the output of the differential amplifier to zero. When the output of differential amplifier 68 is zero its input signals are equal. The result is that the integrator output tends to follow the displacement command signal. That is, as the displacement command signal along line 67 increases or decreases, the integrator output will also increase or decrease. There will be parity between the signals. The feed forward potentiometer 74 is part of a feed forward circuit and is connected through a resistor 74A to the input line 70 of the integrator 71. The feed forward circuit is a conventional technique which provides better responses at high frequencies when switch 60 is closed and switch 61 is open.

A signal will be provided in a suitable manner to select the force mode control at the correct time. Such a signal appears as a "1" signal along line 75. This signal may be a positive signal on line 75 that also sets the flip flop 80 to place the switch set 63 in the opposite positions from that shown in solid lines in FIG. 2. The signal on line 75 actuates the switches 60 and 61 of switch set 59 through the schematic link 62 so that switch 61 opens and switch 60 closes. Flip flop 80 is "set" simultaneously with actuation of switch set 59 and switch 64 closes and switch 65 opens. The integrator 71 output is connected to the output amplifier 66 and thus to the mode switch output line 41. Because the output of integrator 71 on line 72 will be tracking the displacement command signal, there will be no discontinuity or change in signals when switch 64 closes and switch 65 opens as the signals are the same. The integrator 71 then begins integrating the force error signal, placing the system in force control mode. A time constant adjustment potentiometer of conventional design is indicated at 81 in line 46 to provide the desired constant of integration of the signal on line 46 through integrator 71 to line 72. The integrator 71 smoothly ramps from control of one parameter to the other, but switching occurs only when the signals switched are equal.

When in force mode, the output of the difference amplifier 68 tracks the difference between the displacement command signal, which is present on lines 47 and 67, and the output of the integrator 71. There is usually an output other than zero from the amplifier 68 at this time.

When the mode select signal is turned to select displacement control mode, the signal disappears from line 75, indicating that return should be made to stroke or displacement control, switch 61 immediately closes and switch 60 opens. This causes the integrator 71 to begin integrating from its value at the time of opening of switch 60 and closing of switch 61 in response to the signal along line 70 toward the present value of the displacement command on line 67. The rate of integration is controlled by adjustment of a potentiometer 82 in line 69. However, switch 64 remains closed and switch 65 remains open until the flip flop 80 is reset. Reset of flip flop 80 does not occur until there is an output from an AND gate 89 along a line 90.

Line 69 is connected to a line 85 and through an amplifier 86 to a signal level detector or limit detector 87. As stated, the output of amplifier 68 may be at a level other than zero and changing as integrator 71 ramps toward tracking of the displacement command signal. The limit detector 87 is a conventional circuit such as a comparator, made so that it will sense, when the output from the differential amplifier 68 is zero. Limit detector 87 provides a digital signal along line 88 to one input of AND gate 89. The other input of AND gate 89 is connected to the line 75 through an inverting amplifier 91. The output of inverting amplifier 91 is high when the signal on line 75 is low, which low signal actuated switch set 59 to their solid line positions. When the limit detector 87 indicates that the signal from amplifier 68 is zero, that means that the displacement command signal and the signal on line 72 are equal.

The limit detector output triggers the output from the AND gate 89 along a line 90 to reset the flip flop 80, and in so doing it will open switch 64 and close switch 65. Because the integrator 71 will have integrated until the signal on line 72 is equal to the displacement command signal (output of amplifier 68 is zero), there will be no bump or discontinuity when the switching of the switches 64 and 65 is made for displacement command control.

The delay in switching from force control to displacement control after switch 60 opens is provided by use of the flip flop 80, which does not reset until the select force mode signal is removed from line 75, and the limit detector 87 indicates a zero output from the difference amplifier 68.

The mode switch is simple but extremely effective in preventing bumps upon transfer from one mode to another.

The force control mode comprises cascade control, in that the output of summing junction 50 feeds summing junction 56.

What is claimed is:

1. A circuit for providing a transfer of input parameters between first and second input signals to provide a command output signal at an output terminal without discontinuity in the output signal during the transfer including means for providing the first and second input signals respectively, a first integrator having first and second inputs, a differential amplifier, first and second switch means, the first switch means being coupled for controlling input of said first signal to the first input of the integrator when closed, the first switch means being open in a first position and the second switch means then being closed, said second switch means being coupled for connecting the output of said differential amplifier to the first input of said integrator when closed;

the second input of the integrator being connected to a reference;

means connecting the output of the integrator to a first input of said differential amplifier;

third and fourth switch means, said third switch means being open when the fourth switch means is in a closed position and closed when the fourth switch means is open, said third switch means when closed being coupled for connecting the output of the integrator to the output terminal, and said fourth switch means being operable when closed for connecting the second input signal to the output terminal;

means connecting the second input of said differential amplifier to receive the second input signal; and the second and fourth switch means being closed so that the output of the integrator will be driven in a direction to cause the differential amplifier output to equal the reference at the second terminal of the integrator and therefore the integrated output tending to follow the second input signal so that at the time of switching, when the second and fourth switch means are opened and the first and third switch means are closed, the integrator output will be at substantially the same level as the second input signal, the first input signal thereafter acting through the integrator, the output of which is at a level equal to the second input at the time of switching.

2. The apparatus specified in claim 1 wherein at a time of transfer of input parameters from the first input signal to the second input signal, the first switch means opens and the second switch means closes prior to the time the third switch means opens and the fourth switch means closes, whereby when the first switch means opens and the second switch means closes the output of the differential amplifier will drive the integrator until the differential amplifier output is zero, means to sense when the output of the differential amplifier is zero, and thereafter actuate the third switch means and fourth switch means so that the third switch means opens and the fourth switch means closes to disconnect the output of the integrator from the output terminal and at the time connect the second input signal to the output terminal.

3. A circuit for providing a transfer of input parameters between first and second input signals to arrive at a command output signal without discontinuity in the output signal, including means for providing the first and second input signals respectively, a first integrator having an input, a differential amplifier sensing the difference between two inputs thereof, the first switch means controlling coupling and decoupling of said first signal to the input of the integrator, and in an alternate mode coupling and decoupling the output of said differential amplifier to said integrator;

means connecting the output of the integrator to a first input of said differential amplifier, means connecting the second input signal to one of the inputs of the differential amplifier, second switch means coupling and decoupling the output of the integrator to a circuit output and in an alternate mode coupling and decoupling the second input signal to the circuit output; and means to control the switch means to couple the integrator output to the circuit output only when the integrator output and second input signals are substantially equal, and to couple the second input signal to the circuit output only when the integrator output is substantially equal to the second input signal.

4. The circuit of claim 3 wherein the integrator output and the one input of the differential amplifier, the output of the differential amplifier is coupled to the integrator input to form a closed loop when the first signal is uncoupled from the integrator input.

5. The circuit of claim 4 wherein the differential amplifier senses the difference between the integrator output and the second input signal, and is operable to reduce such difference to zero when the first signal is uncoupled from the integrator output.

6. The circuit of claim 5 wherein the means to control includes signal level detector means the output of the differential amplifier is connected to the signal limit detection means, said signal level detector means providing a detection output signal when the integrator output equals the second input signal and controlling decoupling the integrator output from the circuit output coupling the second input signal to the circuit output only when the detection output signal is present.

7. The circuit of claim 6 wherein the output of the integrator and the second input signal remain connected to the differential amplifier and when the first input signal is coupled to the integrator and the output of the differential amplifier is decoupled from the integrator the output of the differential is at a value which is a function of the difference of the integrator output and the second input signal.

* * * * *